INVENTOR
ERWIN-WALTER SIBER

By Cushman Darby & Cushman
ATTORNEYS

Oct. 10, 1967  ERWIN-WALTER SIBER  3,346,306
TRACK ELEMENT FOR A TRACK-LAYING VEHICLE

Filed Nov. 16, 1964  5 Sheets-Sheet 3

INVENTOR
ERWIN-WALTER SIBER

By
Cushman, Darby & Cushman
ATTORNEYS

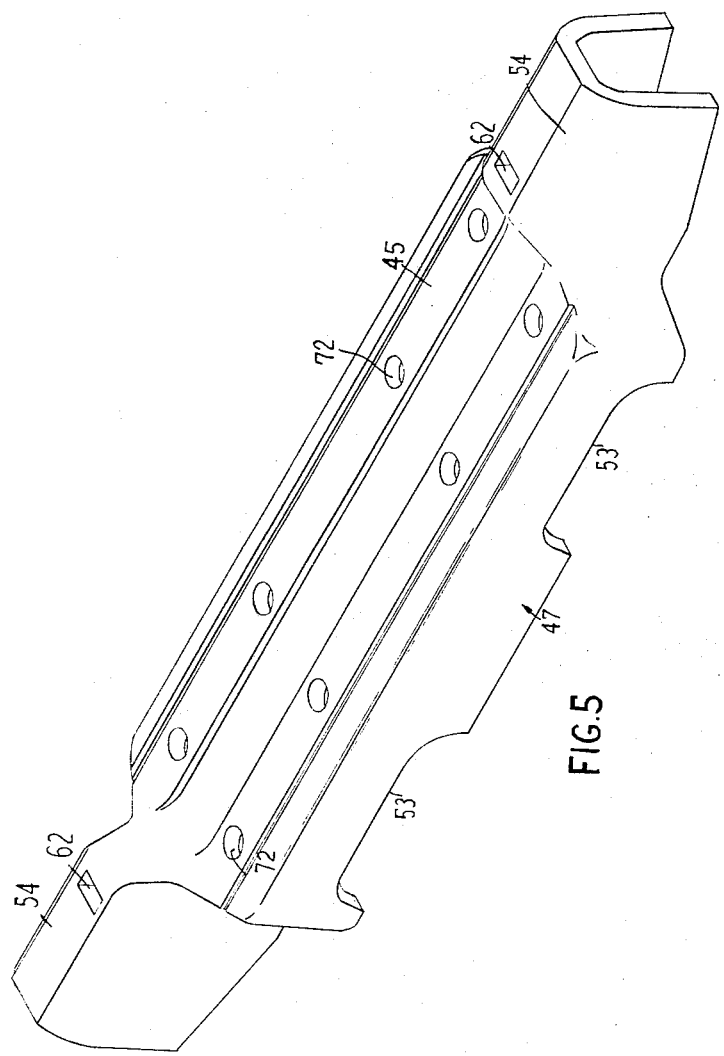

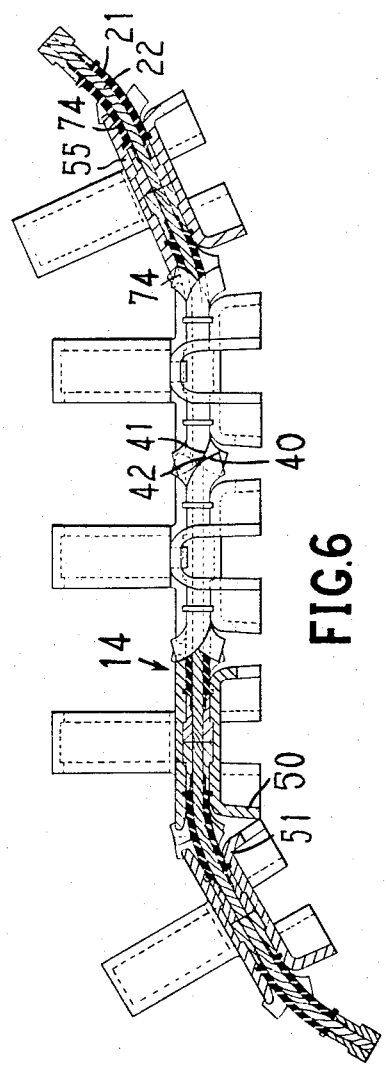

United States Patent Office 3,346,306
Patented Oct. 10, 1967

3,346,306
TRACK ELEMENT FOR A TRACK-LAYING VEHICLE
Erwin-Walter Siber, Longeuil, Quebec, Canada, assignor to Go-Tract Limited, Longeuil, Canada, a company of Canada
Filed Nov. 16, 1964, Ser. No. 411,433
14 Claims. (Cl. 305—40)

This invention concerns an element of a track for a track-laying vehicle. The invention is applicable to a track-laying vehicles whether civilian or military.

According to the present invention, there is provided an element of a track for a track-laying vehicle, which element is adapted to form one of a series of like elements which are secured consecutively to each other to constitute the said track; the said element comprising two relatively movable parts; a plurality of cables, each of said cables being anchored to both of said parts; means on said parts to permit each of the latter to be secured to the adjacent part of the adjacent element; and inter-engageable members carried by said parts, said inter-engageable members being capable of abutting and moving over each other to permit the element to be bent to a substantial extent about its transverse axis from an aligned position of the said parts and in directions both towards and away from the center of the track, the inter-engageable members being engageable with each other throughout said bending and preventing any substantial relative vertical, sideways and approaching movement of adjacent portions of said parts.

Preferably the two parts are respectively provided with curved tongues which constitue the said inter-engageable members. Thus each of the said two parts may have upwardly and downwardly curved tongues having curved surfaces which are respectively adapted to abut and move over the curved surfaces of the downwardly and upwardly curved tongues of the other said part, the upwardly and downwardly curved tongues, moreover, having side surfaces which are adapted to abut and move over one another and to restrict transverse relative movement thereof.

The arrangement is preferably such that the curved tongues of the two parts abut each other when the element is loaded in other than longitudinal tensile loads and are spaced from each other when subjected to longitudinal tensile loads.

Each of the said parts is preferably U-shaped, each limb of each said U-shaped part being provided with said upwardly and downwardly curved tongues.

Each said part is preferably secured to a ground engaging member, the ground engaging members of the said parts having portions which are normally spaced apart but which are adapted to be brought into abutment with each other so as to limit bending of the element away from the centre of the track.

Each ground engaging member may be U-shaped, each limb of each U-shaped ground engaging member being adapted to be brought into abutment with the adjacent limb of the other U-shaped ground engaging member.

Each ground engaging member may be formed to receive abutting portions of two adjacent said parts and to prevent them from being longitudinally separated from each other.

Each ground engaging member is also preferably formed with at least one tooth portion which is adapted to mesh with a sprocket of the vehicle.

The arrangement is preferably such that when said portions of the ground engaging members move towards each other, the inter-engageable members guide them towards abutment with each other.

Each said part is preferably secured to a cover plate, the cover plates of the two said parts having portions which are normally spaced apart but which are adapted to be brought into abutment with each other so as to limit bending of the element towards the centre of the track.

Each cover plate may be formed to receive abutting portions of two adjacent said parts and to prevent them from being longitudinally separated from each other.

The arrangement is also preferably such that when the said cover plates move toward each other, the inter-engageable members guide them toward abutment with each other.

The cables may be disposed in and extend outwardly of a sheet of resilient material opposite edges of which respectively abut the said two parts.

Each cable is preferably a stranded cable whose strands are lubricated so as to be able to move readily over one another.

There may be an annular gap between each cable and its resilient sheet, the said annular gap containing a quantity of lubricant.

Sealing means may be provided for preventing escape of the said lubricant from each cable.

Each cover plate may extend to adjacent midway between the two said parts and may have a curved surface which is adapted to be contacted by the respective resilient sheet so as to prevent the latter, and hence the cables disposed therein, from being bent beyond a predetermined radius of curvature.

Preferably each said cable is mounted in a bore in the respective said part, each end of said cable being gripped in an end portion of the respective bore, and the cable being spaced from the remainder of the bore by an annular space, the said annular space being filled, throughout at least part of its length, by a part of the resilient sheet which constitutes the said sealing means.

The invention is illustrated, merely by way of example, in the accompanying drawings, in which:

FIGURE 5 is a perspective view of yet another part of the structure shown in FIGURE 2; and FIGURE 6 is a cross-section through a part of the said track illustrating the positions of the components thereof during bending.

Figure 1:
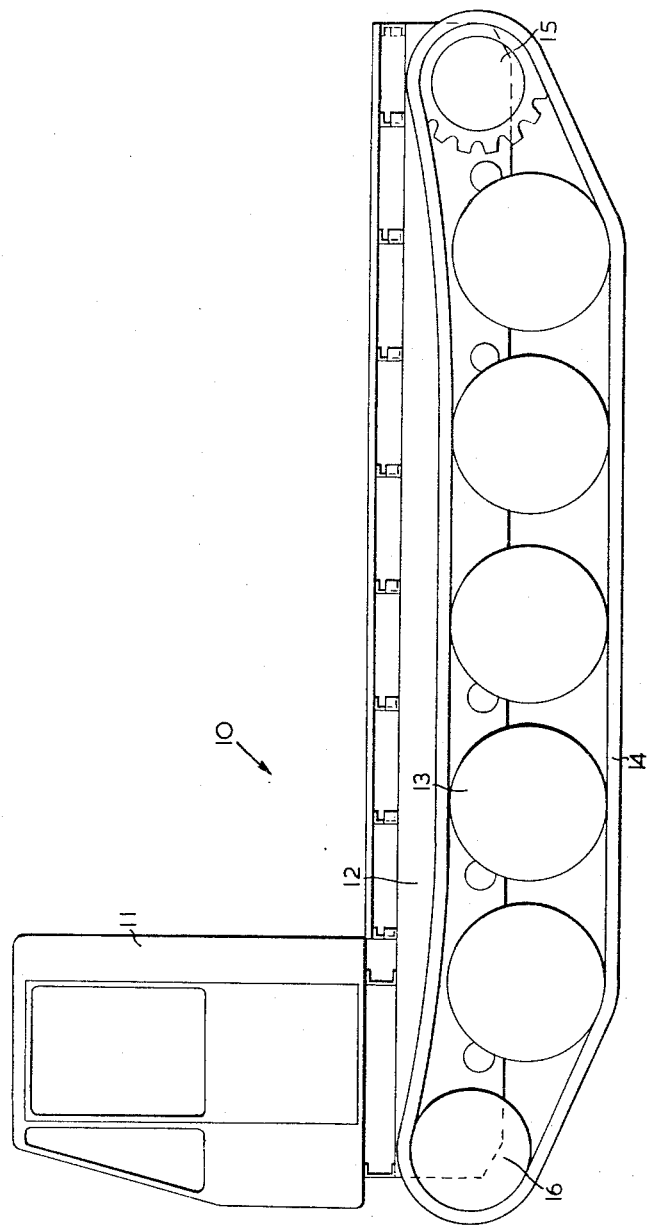
FIGURE 1 is a diagrammatic side elevation of a track-laying vehicle provided with a track embodying the present invention.
Figure 2:
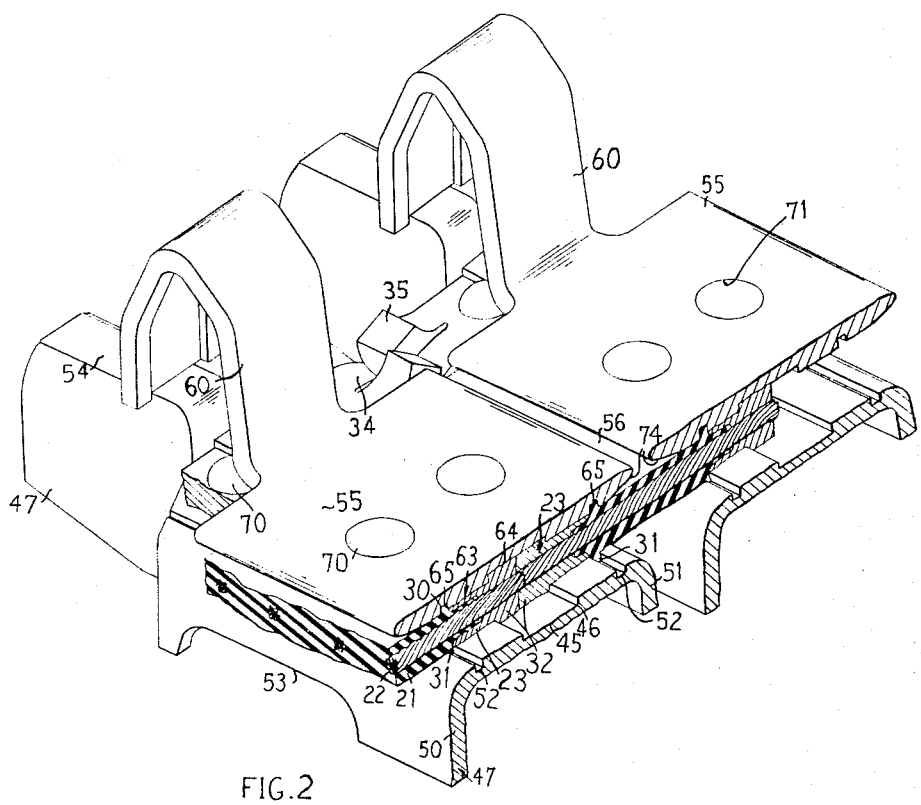
FIGURE 2 is a broken away perspective view, partly in section of a part of the said track.

In FIGURE 1 there is shown a track-laying vehicle 10, e.g. a transporter, having a driver's cabin 11 and a body portion 12. The body portion 12 is carried by two sets of wheels 13 (only one set of which are shown) which are disposed on opposite longitudinal sides of the vehicle 10.

Each set of wheels 13 is mounted in an endless track 14 which is entrained over two transversely spaced driven sprockets 15 (only one shown) and an idler wheel or wheels 16.

Figures 3, 4:
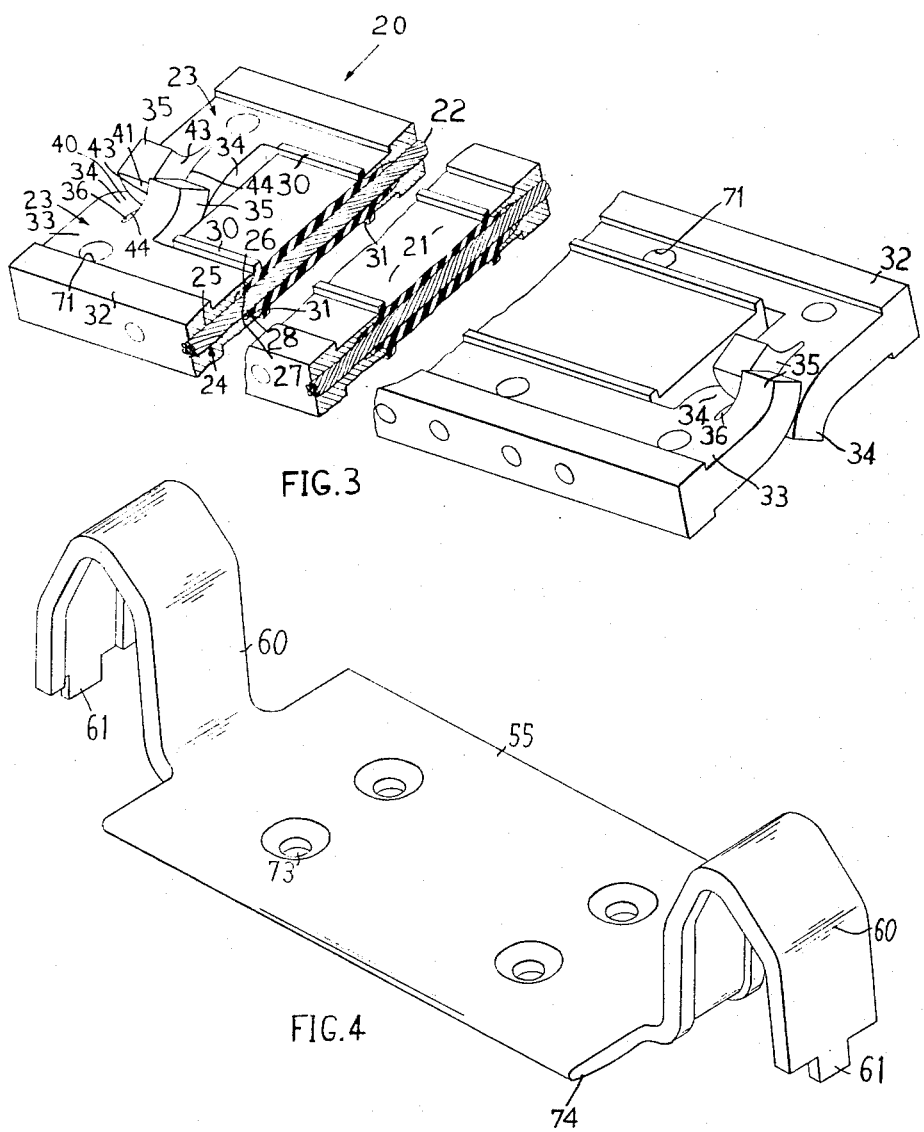
FIGURE 3 is an exploded perspective view, partly in section, of a part of the structure shown in FIGURE 2.
FIGURE 4 is a perspective view of another part of the structure shown in FIGURE 2.

The track 14 comprises a series of like elements or links 20 (see FIGURE 3) which are secured consecutively to each other to constitute the said track. Each link 20 comprises a sheet 21 of rubber or other resilient material through and outwardly of which extend a plurality of transversely spaced apart, helically stranded, longitudinally extending cables 22.

To limit the tendency of stranded wire cables to unwind when in tension, successive strands of each cable 22 may be wound in opposite directions.

Each link 20 is provided with two substantial U-shaped parts 23, each part 23 having longitudinally extending bores 24 therein in which the cables 22 are disposed.

By applying compressive loads to the parts 23, the outer ends 25 of the bores 24 have been crimped into gripping contact with the respective ends of the cables 22 so as to form anchorages therefor.

The inner portion 26 of each bore 24 is spaced from the respective cable 22 by an annular space 27 which is filled with a split conical portion 28 of the resilient sheet 21.

The strands of each cable 22 are lubricated so as to be able to move readily over one another. A heavy oil is suitable as a lubricant, although a solid lubricant may be employed if so desired.

The lubricant may be introduced onto the strands of the cables 22 by lubricating the separate strands thereof prior to or during winding. The lubricant may, moreover, be replenished by means of hypodermic syringe introduced through the resilient sheet 21. If desired, an annular gap (not shown) may be provided between each cable 22 and its resilient sheet 21, the said annular gap containing a quantity of lubricant.

The portions 28 of the resilient sheet 21 act as seals to prevent escape of the lubricant.

The upper surface of the resilient sheet 21 is provided at its opposite edges with flanges 30 whose side faces respectively abut the two parts 23. The lower surface of the resilient sheet 21 is also provided at its opposite edges with flanges 31 which are aligned with the flanges 30 and whose side faces also abut the parts 23.

The provision of the flanges 30, 31 ensure that if the link 20 is bent about its transverse axis toward or away from the centre of the track 14, the cables 22 will not be bent adjacent to the end thereof at which they are anchored.

Each of the parts 23 is provided with an end flange 32 and has side limbs 33. Each of the limbs 33 is provided with a downwardly curved tongue 34 and with an upwardly curved tongue 35 which is spaced from its respective downwardly curved tongue 34 by a small gap 36.

The downwardly and upwardly curved tongues 34, 35 are respectively provided with curved surfaces 40, 41. The curved surfaces 40, 41 of one of the parts 23 are adapted to abut and roll over the curved surfaces 41, 40 respectively of the other part 23. Such abutment occurs however only when the link 20 is loaded in other than longitudinal tensile loads, the respective surfaces 40, 41 of the two parts being spaced from each other when subjected to longitudinal tensile loads by a gap 42 (see FIGURE 6).

The upwardly curved tongues 35 of the two parts 23 have side surfaces 43 which are adapted to abut and slide over one another. Similarly, the downwardly curved tongues 34 have side surfaces 44 which are adapted to abut and slide over one another.

By reason of the provision of the gap 36, the side surfaces 43 of the two parts 23 are normally slightly spaced apart, while the side surfaces 44 of the two parts 23 are also normally spaced apart. Only restricted transverse relative movement can, however, occur between the two parts 23 since any substantial transverse relative movement will bring the surfaces 43 into contact with each other and will also bring the surfaces 44 into contact with each other. The restriction of any substantial transverse relative movement assists in preventing derailment of the wheels 13.

The curved tongues 34, 35 act as cams which permit the link 20 to be bent to a substantial extent about its transverse axis from a position in which the parts 23 thereof are aligned and in directions towards and away from the centre of the track 14. The curved tongues 34, 35, however, while engageable with each other throughout said bending, restrict certain predetermined relative movement of adjacent portions of the two parts 23. Thus, as already described above, the curved tongues 34, 35 restrict transverse relative movement of adjacent portions of the parts 23. The curved tongues 34, 35 also restrict all relative vertical movement of adjacent portions of the parts 23, since any such relative vertical movement will bring certain of the curved tongues 34, 35 of one of the parts 23 into abutment with the respective curved tongues of the other parts. The curved tongues 34, 35 will, moreover, restrict relative movement of the parts 23 towards one another since any such movement will again be resisted by abutment between respective curved tongues of the two parts 23. Furthermore, the curved tongues 34, 35 will prevent twisting and fanning movement of the two parts 23 about the longitudinal axis of the link 20 since again any such twisting and fanning movement will be resisted by the curved tongues 34, 35.

Since the curved tongues 34, 35 restrict relative vertical movement, relative sideways stepping, and relative twisting and fanning of adjacent portions of the parts 23, these parts are prevented from adopting a configuration which would result in severe loading of the cables 22 close to their anchorage points with resulting severe stresses.

The end flanges 32 of abutting parts 23 of adjacent links 20 are located and secured in a groove 45 in the upper surface 46 of an inverted U-shaped ground engaging grouser 47, the side walls of the groove 45 preventing longitudinal separation of the said adjacent links.

Each grouser 47, which has limbs 50, 51, is provided with two spaced square-section grooves 52 in which are located the flanges 31 of the resilient sheets 21 of the two adjacent links 20.

As best seen in FIGURE 5, each grouser 47 has two transversely spaced cut-away portions 53 to improve ground adhesion and is provided at its ends with gear tooth portions 54 which are respectively adapted to mesh with the sprockets 15.

As clearly shown at the left hand side of FIGURE 6, if a part of the track 14 becomes reversely bent, i.e. is bent in a direction away from the centre of the track 14, such reverse bending is limited by the engagement which will ultimately occur between the limb 50 of one grouser 47 and the limb 51 of the adjacent grouser 47. Such reverse bending can, for example, occur when the vehicle passes over logs or other obstacles.

The track 14 is provided with a series of cover plates 55 which are normally spaced from each other axially by gaps 56 and which extend to close to the centres of the links 20. The cover plates 55 are adapted for the passage thereover of the wheels 13.

In order to guide the wheels 13, and to locate the grouser 47 with respect to the sprockets 15, each cover plate 55 is provided at each of its opposite transverse edges with an inverted U-section guide portion 60. The outer end of each guide portion 60 is provided with a lug 61 (FIGURE 4) which fits into a hole 62 (FIGURE 5) in the gear tooth portion 54 of the respective grouser 47.

Each cover plate 55 has an under surface 63 which is formed with a recess 64 in which are located and secured the upper portions of the end flanges 32 of abutting parts 23. The side walls of the recess 64 prevent longitudinal separation of adjacent links 20. The under surface 63 is also provided with two axially spaced rectangular section grooves 65 in which are located the flanges 30 of the resilient sheets 21 of the two respective links 20.

The cover plates 55, parts 23, resilient sheets 21, and grousers 47 are also connected together with rivets or bolts 70. All the rivets or bolts 70 pass through holes 71 in the parts 23 and holes 72 in the grouser 47, while some of the rivets or bolts 70 also pass through countersunk holes 73 in the cover plates 55.

By reason, however, of the fact that the parts 23 are longitudinally secured together by the grousers 47 and cover plates 55 independently of the use of the rivets or bolts 70, such rivets or bolts are maintained substantially free from subjection to shear stresses.

The cover plates 55 are provided at their longitudinally opposite ends with radiused portion 74 which extend outwardly of the region in which the cables 22 are anchored. As shown on the right hand side of FIGURE 6, when the track 14 becomes normally bent, i.e., with the kind of curvature which would be caused by its passing around the sprockets 15, the radiused portions 74 ensure that the track has a continuous radius which although not identical to the pitch circle radius of the sprockets 15 is the true radius of the non-anchored portion of the cable 22 minus half the thickness of the resilient sheet 21. This ensures that each cable 22 bends over a predetermined radius, that it is supported by the respective cover plates 55, that a cushion is provided throughout this bending by the contact between the radiused portions 74 with the resilient sheet 21, and that stresses at the anchored ends of the cable are minimized. Without this feature the cables 22 would bend close to their anchorage points and would straighten out therebetween, and this would result in sharp bends and highly localised stresses.

When branches, roots, or other debris are taken around by the track 14 and through the sprockets 15 a condition of over-bending will occur in the track 14 and towards the center thereof. Under this condition two adjacent cover plates 55 will contact each other and thus limit the amount of bending of the cables 22, the latter still, however, following the predetermined radius described above. Moreover the over-bending which will then occur, will take place at the center of the cable where it is most flexible.

The cover plates 55 are such that the wheels 13 pass thereover without touching the resilient sheets 21. Moreover any foreign matter which is trapped between the wheels 13 and track 14 and whose particle size is sufficient to cause damage to the resilient sheets 21 cannot pass through the narrow gaps 56 between adjacent cover plates 55. Moreover the upper or return run of the track 14 adopts a catenary shape which encourages such foreign matter to drop out of the track.

The curved tongues 34, 35 are such that when either the cover plates 55 or grousers 47 move towards each other, the curved tongues 34, 35 guide them towards abutment with each other so as to limit the permissible amount of bending movement.

As will be appreciated, since each of the cables 22, extends only from its anchorage in one part 23 of the respective element 20 to the other part 23 thereof, any stretching of the cables 22 which occurs in operation will not be sufficient to bring the curved tongues 34, 35 out of engagement with each other. It will also be appreciated that the provision of the curved tongues 34, 35 on parts which are not brought into direct contact with the ground helps to prevent damage thereto, while the formation of the track 14 from a series of like links 20 facilitates repair of the track when necessary.

I claim:
1. An element of a track for a track laying vehicle, which element is adapted to form one of a series of like elements which are secured consecutively to each other to constitute the said track; the said element comprising: two relatively movable parts; a separate set of cables connecting each of said parts of the element, each cable of said set having ends respectively anchored to said two parts of the element; means on said parts to permit each of the latter to be secured to the adjacent part of the adjacent element; and each of said two parts having upwardly and downwardly curved tongues permitting the element to be bent to a substantial extent about its transverse axis from an aligned position of the said parts and in directions both towards and away from the center of the track, said upwardly and downwardly curved tongues having side surfaces and curved surfaces, the curved surfaces of said upwardly and downwardly curved tongues of one of said parts being adapted to move over the curved surfaces of the downwardly and upwardly curved tongues respectively of the other of said parts and the side surfaces of said upwardly and downwardly curved tongues of one of said parts being adapted to abut and move over the side surfaces of the upwardly and downwardly curved tongues respectively of the other of said parts whereby said tongue are engageable with each other throughout said bending and prevent any substantial relative vertical, sideways and approaching movement of adjacent portions of said parts.

2. An element as claimed in claim 1 in which said curved tongues of said two parts abut each other when the element is loaded in other than longitudinal tensile loads and are spaced from each other when subjected to longitudinal tensile loads.

3. An element as claimed in claim 1 in which each of said parts is U-shaped and provided with a pair of limbs, each of said limbs of each of said U-shaped parts being provided with said upwardly and downwardly curved tongues.

4. An element as claimed in claim 1 including a ground engaging member secured to each of said parts, said ground engaging member of one of said parts having a portion normally spaced from a portion of the ground engaging member of the other of said parts, said portions of the said ground engaging members being brought into abutment with each other to limit bending of the element away from the center of the track.

5. An element as claimed in claim 1 including a ground engaging member secured to each part, said ground engaging member of one part having a portion normally spaced from a portion of the ground engaging member of the other part, said portions of said ground engaging members being adapted to abut with each other to limit bending of the element away from the center of the track, and in which, when said portion of said ground engaging members move towards each other, said tongues of said parts guide them towards abutment with each other.

6. An element as claimed in claim 1 including a cover plate secured to each of said parts, said cover plates of said two parts having portions which are normally spaced apart and which are adapted to be brought into abutment with each other so as to limit bending of the elements towards the center of the track.

7. An elements claimed in claim 6 in which each cover plate is formed to receive abutting portions of adjacent parts of adjacent elements to prevent the adjacent parts from being longitudinally separated from each other.

8. An element as claimed in claim 6 in which when said cover plates move toward each other, said tongues of said two parts guide them toward abutment with each other.

9. An element as claimed in claim 4 in which each ground engaging member is U-shaped and provided with a pair of limbs, each limb of each U-shaped ground engaging member being adapted to be brought into abutment with the adjacent limb of the other U-shaped ground engaging member.

10. An element as claimed in claim 4 in which each ground engaging member is formed to receive abutting portions of parts of adjacent elements to thereby prevent the elements from being longitudinally separated from each other.

11. An endless track for a track-laying vehicle comprising: a plurality of elements, each of said elements including two relatively movable parts, a plurality of cables, each of said cables being anchored to both of said parts, and interengageable members respectively carried by said two parts, said interengageable members being capable of abutting and moving over each other to permit the elements to be bent to a substantial extent about its transverse axis from an aligned position of the said parts and in directions both towards and away from the center of the endless track, said interengageable members also being engageable with each other throughout said bending and preventing any substantial relatively vertical, sideways and approaching movement of adjacent portions of said two parts; and means operatively connecting adjacent elements together, said means including a ground engaging member secured to adjacent parts of adjacent elements, each of said ground engaging members having a portion thereon normally spaced from a portion on the adjacent ground engaging member, said portions of adjacent ground engaging members being brought into abutment with each other to limit bending of the element to which the adjacent ground engaging members are attached away from the center of the track, and each ground engaging member being formed to receive abutting portions of adjacent parts of adjacent elements to thereby prevent the elements from being longitudinally separated from each other.

12. An endless track for a track-laying vehicle comprising: a plurality of elements, each of said elements including two relatively moveable parts, a plurality of cables, each of said cables being anchored to both of said parts, and interengageable members respectively carried by said two parts, said interengageable members being capable of abutting and moving over each other to permit the element to be bent to a substantial extent about its transverse axis from an aligned position of the said parts and in directions both towards and away from the center of the endless track, said interengageable members also being engageable throughout said bending and preventing any substantial relatively vertical, sideways and approaching movement of adjacent portions of said two parts; and means operatively connecting adjacent elements together, said means including a cover plate secured to adjacent parts of adjacent elements, each cover plate having a portion which is normally spaced apart from a portion of an adjacent cover plate and adapted to a brought into abutment therewith so as to limit bending of adjacent elements towards the center of the track, each of said cover plates being formed to receive abutting portions of adjacent parts of adjacent elements to prevent the adjacent elements from being longitudinally separated from each other.

13. An endless track as claimed in claim 12 in which said interengageable members of the parts of each element respectively guide said cover plates of the element towards abutment with each other.

14. An endless track as claimed in claim 12 in which said means also includes a ground engaging member secured to adjacent parts of adjacent elements, each ground engaging member being formed to receive abutting portions of adjacent parts of adjacent elements to thereby prevent the elements from being longitudinally separated from each other.

References Cited
UNITED STATES PATENTS

| | | | |
|---|---|---|---|
| 1,230,504 | 6/1917 | Nelson | 305—48 X |
| 1,358,934 | 11/1920 | Cook | 305—40 X |
| 1,517,716 | 12/1924 | Dutkiewicz | 205—40 |
| 1,632,674 | 6/1927 | Pearson. | |
| 2,063,762 | 12/1936 | Schultz | 305—40 |
| 2,487,813 | 11/1949 | Knox | 305—38 |
| 2,596,919 | 5/1952 | Smith | 305—38 |
| 3,063,758 | 11/1962 | Fiske | 305—43 X |

BENJAMIN HERSH, *Primary Examiner.*

MILTON BUCHLER, *Examiner.*

R. J. JOHNSON, *Assistant Examiner.*